United States Patent [19]

Anglikowski

[11] 4,086,448
[45] Apr. 25, 1978

[54] LOOP-AROUND TEST CIRCUIT FOR TELECOMMUNICATIONS LINES

[75] Inventor: Ronald Edward Anglikowski, Bayville, N.J.

[73] Assignee: Bell Telephone Laboratories, Incorporated, Murray Hill, N.J.

[21] Appl. No.: 788,545

[22] Filed: Apr. 18, 1977

[51] Int. Cl.² .............................................. H04B 3/46
[52] U.S. Cl. ............................................. 179/175.3 R
[58] Field of Search ............... 179/175.3 R, 175.31 R, 179/175.3 F, 170 R, 170 A, 175.2 R

[56] References Cited

U.S. PATENT DOCUMENTS

| | | | |
|---|---|---|---|
| 2,214,130 | 9/1940 | Green et al. | 179/175.3 R |
| 2,666,099 | 1/1954 | Bonner | 179/175.3 R |
| 3,300,592 | 1/1967 | Hall | 179/175.2 |
| 3,389,234 | 6/1968 | Cotner | 179/175.2 |
| 3,674,947 | 7/1942 | Chulak | 179/175.2 |
| 3,704,348 | 11/1972 | McIntosh et al. | 179/175.2 |
| 3,742,155 | 6/1973 | Buck et al. | 179/175.3 R |
| 3,790,723 | 2/1974 | Stewart | 179/175.3 R |
| 4,021,625 | 5/1977 | Bradley | 179/175.3 R |

*Primary Examiner*—Douglas W. Olms
*Attorney, Agent, or Firm*—Charles E. Graves

[57] ABSTRACT

A control unit circuit for loop-around testing of telecommunication lines improves over its predecessor by circuitry that accepts a tone from either of the incoming lines without directly connecting the lines, thus to prevent fraudulent use of telephone lines that was possible in the past. The key circuit is an amplitude comparison circuit that detects a tone only within a certain frequency range. The circuit locks on to the detected tone and produces a corresponding sinusoidal output signal having the same level as the incoming tone.

6 Claims, 1 Drawing Figure

U.S. Patent   April 25, 1978   4,086,448
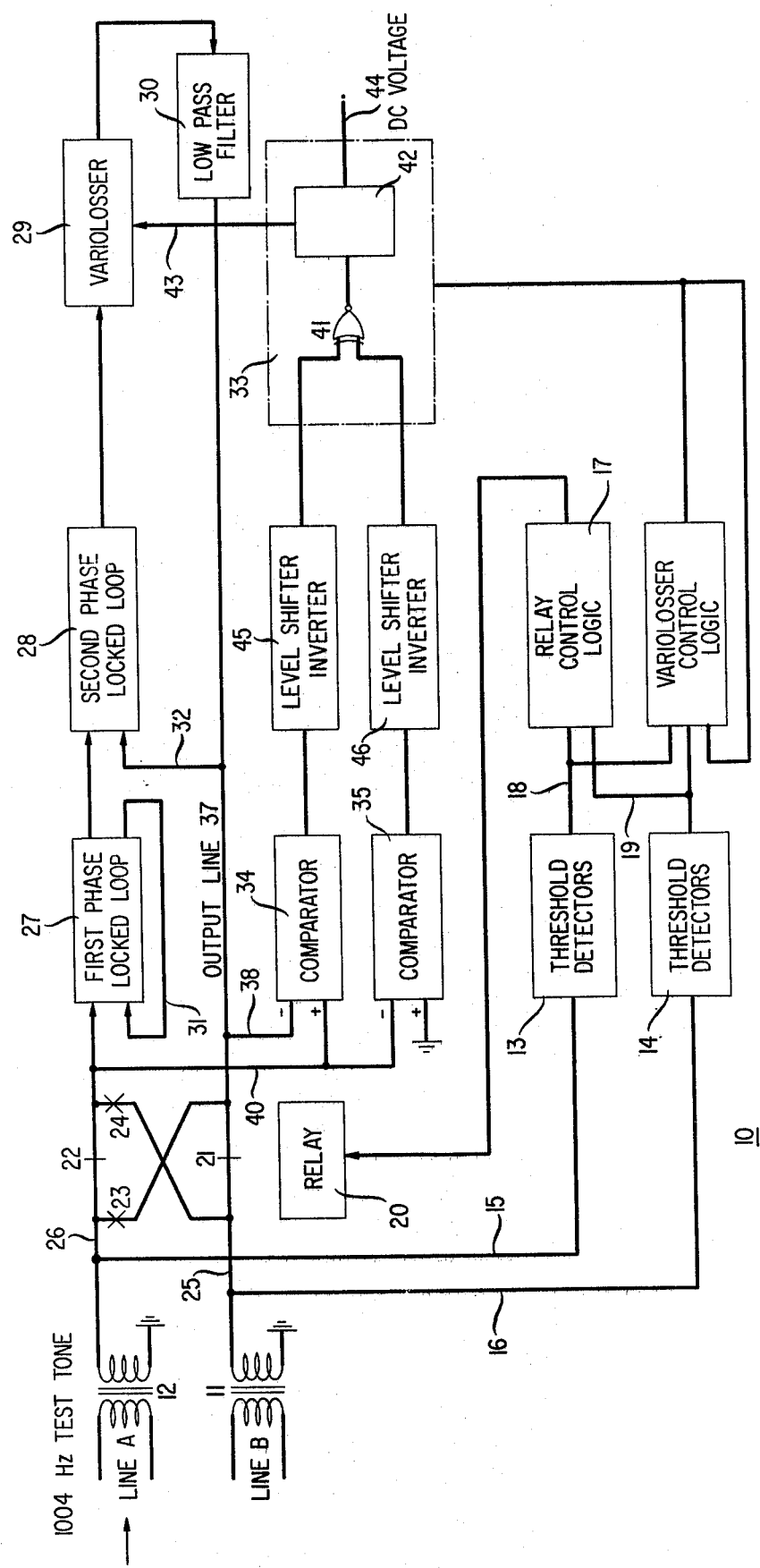

LOOP-AROUND TEST CIRCUIT FOR TELECOMMUNICATIONS LINES

FIELD OF THE INVENTION

This invention relates to telecommunication line testing; and more particularly to a circuit and system for testing the transmission qualities of a given line by use of a loop-around testing.

BACKGROUND OF THE INVENTION

Loop-around testing permits individual loops to be tested end-to-end by placing a call to the common central office via a first line to access a loop-around test control unit. The number of the line to be tested is then dialed from the remote location into the control unit, and a connection is set up through the control unit which includes both the call-in loop and the loop to be tested. Normally, a craftsperson is present at the far end of the line under test.

The connecting set in the central office for earlier loop-around test control circuits, passed voice frequency signals. A potential thus existed for fraudulent use of the network by those who have knowledge of how to access the central office loop-around test equipment. In response to this, more recently designed loop-around test equipment provided for the passing only of a tone signal and the blocking of any speech signals. Unfortunately, however, the noise occasionally present on some carrier system looks like speech signal; and hence the system would disconnect at undesired times as well as when intended to.

SUMMARY OF THE INVENTION

The loop-around test control circuit of the present invention avoids the preceding problem while precluding fraudulent use of the network by preventing the passing of voice signals. The test tone applied at the remote end of a loop under test is received and replicated in frequency by use of a phase-locked loop. Once lock-on is achieved, a further control circuit assures that the outgoing tone has the same level as the incoming tone at all times.

Unlike the predecessor systems, no direct connection occurs between the two incoming lines. However, the loop-around control circuitry accepts test tone from either of the incoming lines. Advantgeously, the circuitry responds only to tones which are within approximately 25 Hz, for example, of a nominal loop-around test tone of, for example 1004 Hz.

The invention and its further objects, features and advantages will be readily appreciated from a reading of the description to follow of the illustrative embodiments taken in conjunction with the drawing.

DESCRIPTION OF THE DRAWING

The FIGURE is a schematic block diagram of the loop-around test circuit of the present invention.

DETAILED DESCRIPTION OF THE ILLUSTRATIVE EMBODIMENT

The basic approach of generating a tone at the central office for loop-around test purposes, in response to a tone received, instead of connecting two trunks together, is illustrated in the Figure. The test circuit, denoted 10, is connected in series with line A and line B, the two lines over which the measurement is to take place. Inductive coupling of lines A and B through the respective transformers 11 and 12 is advantageous to provide balanced termination for the two lines and unbalanced termination for the control unit.

The unit 10 detects an incoming test tone of, for example, 1004 Hz present on either line, through threshold detectors 13, 14. The test tone appearing on line A, for example, is detected by detector 13 through connection 15; tone on line B is supplied to detector 14 via connection 16.

The detectors 13, 14 advantageously respond to a tone level of between minus 15 dmb and zero dbm, by supplying a signal to relay control logic unit 17. Detectors 13, 14 are conventional op-amplifiers connected as threshold detectors.

Relay control logic unit 17 receives an output from either detector 13 or 14 via lines 18 or 19, respectively. Unit 17 controls the relay 20, which has normally closed contacts 21, 22 in respective lines 25, 26 serving respectively the transformers 11, 12. In its unoperated load, relay 20 maintains a connection between lines A and B, via the circuit consisting of line 26, contact 22, first phase lock loop 27, second phase lock loop 28, variolosser 29, low pass filter 30, relay contact 21, line 25, and transformer 11.

Pursuant to one facet of the invention, if the unit 10 receives a 1004 Hz test tone on line B, at the appropriate threshold level, unit 17 responds by operating relay 20. Operation of relay 20 opens contacts 21, 22 while closing contacts 23, 24. A circuit path is thereby produced between line B and line A consisting of leg 25, closed relay contact 24, the network consisting of elements 27, 28, 29, 30, through the closed contact 23, leg 26, and transformer 12.

In either connection, unit 10 operates in the same fashion. The first phase-locked loop 27 locks on to the incoming 1004 Hz test signal. Advantageously, the loop tolerates approximately plus or minus 500 Hz frequency variation from the norm.

The first phase lock loop 27 produces a minus 90° phase shift between the signal received at its input, and the signal transmitted at its output terminal. Second phase lock loop 28 produces a plus 90° phase shift. The feedback leg 32 of phase lock loop 28 is taken from the output of low pass filter 30 which is serially connected at its input end to variolosser 29 and loop 28. Thus, one input to the loop 28 is also the output signal of the unit 10. By these expedients, the input and output signals of control unit 10 are assured of having the same frequency; and also are in phase with each other.

The output of loop 28 passes through variolosser 29, the adjustment of which is controlled through logic unit 33. Pursuant to a further facet of the invention, the input and output signals of the control unit 10 are continuously compared to each other in amplitude by action of the comparators 34, 35. Comparators 34, 35 are advantageously high-gain operational amplifiers with either high or low outputs. Comparator 34 is connected to the output line 37 of unit 10, through connecting line 38; and connected to the input line denoted 39 through connecting line 40. Comparator 35 is connected only to input line 39 through the leg 40, as well as to ground as shown in the Figure.

If the input signal received on line 39 by the control unit 10 is larger than its output signal occurring on line 37, then during each positive half cycle of the input signal the output of comparator 34 will be relatively high. During the negative half cycle of the input signal, the output of comparator 34 will be at its low level. The purpose of comparator 35 is to detect phase comparisons of the input signal to determine whether the signal on line 39 is in its positive half cycle or its negative half cycle.

The outputs of the two comparators 34, 35 are fed to logic unit 33 where a number of operations routine in logic circuitry take place. Specifically, the outputs of the comparators 34, 35 after being shifted in level and inverted as by transistor drives 45, 46, are connected to the inputs of exclusive NOR gate 41 of logic unit 33. Exclusive NOR gate 41 inverts the output of inverter 45 on the negative half cycle of the input signal but not on the positive half cycle. Therefore, if the input signal to control unit 10 is larger than the output signal, the output of exclusive NOR gate 41 will be at its low level. If the input signal on line 39 on the other hand, is smaller that the output signal on line 37, the output of exclusive NOR gate 41 will be at its high level.

Thus, the output of exclusive NOR gate 41 is a series of high and low level signals which represent the amplitude difference between the input and output signals of the unit 10. This output is integrated in integrator 42 as by a simple resistance capacitance network within integrator 42 (network not shown), to produce a modulation of the DC voltage from the DC source denoted 44. This DC voltage output controls the gain of the variolosser 29.

The output of comparators 34, 35 in conjunction with exclusive NOR gate 41, adjust the gain of variolosser 29 until the output and input signals appearing on lines 39, 37 are equal in amplitude. The variolosser control voltage appearing on line 43, is continuously updated by the operation of comparators 34, 35 to maintain the input and output levels of unit 10 equal.

The spirit and scope of the invention is embraced in the scope of the claims to follow.

What is claimed is:

1. A loop-around circuit connecting to a first and a second telephone line, for replicating in frequency and amplitude a received single frequency tone on one of said lines, and applying said replicated tone to the other of said lines, said circuit comprising:
   a first phase-locked loop;
   a variable attenuator;
   a comparator;
   said phase-locked loop including input terminals for receiving a single frequency tone, and means for generating an output signal of the same frequency and phase;
   means for applying the output signal of the said phase-locked loop to said variable attenuator;
   means connecting said comparator to said input signal of said phase-locked loop and to said output signal of said variable attenuator,
   said comparator including means for generating an output signal representing instantaneous amplitude difference between said input signal from said phase-locked loop and said output signal from said variable attenuator; and
   means including said comparator output signal for adjusting said variable attenuator, to cause said instantaneous amplitude difference to seek zero, thereby to equalize the amplitude of said replicated tone and said received tone.

2. A circuit in accordance with claim 1, further including means for determining whether said received signal frequency tone is present on said first line or on said second line; and means responsive to said determination for affecting a selective connection on said first line to the input of said phase-locked loop, with said second line connected to the output of said variable attenuator; and vice versa.

3. A circuit in accordance with claim 2, further comprising:
   a low pass filter connected serially to the output of said variable attenuator for attenuating the harmonics of said single frequency test tone.

4. The circuit of claim 3 further including said first and second lines.

5. The circuit of claim 4, further comprising:
   means at the far end of either of said lines for generating said single frequency tone.

6. A loop-around telephone circuit comprising:
   an input and an output;
   means for interchangeably connecting said circuit to a first and a second telephone line without metallically connecting said lines; and
   means for receiving a tone signal on a one of said lines, for replicating same in frequency, phase and amplitude and for applying said replicated signal to the other of said lines.

* * * * *